Sept. 12, 1933.  A. D. RICCIA  1,926,668
SYSTEM FOR AUTOMATICALLY CONTROLLING THE SPEED OF ELECTRIC MOTORS
Filed May 21, 1928  3 Sheets-Sheet 2
*Fig.2a*  *Fig.2b*  *Fig.2c*
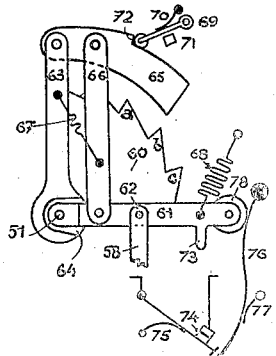 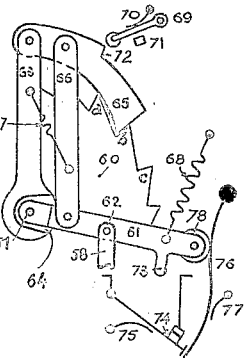 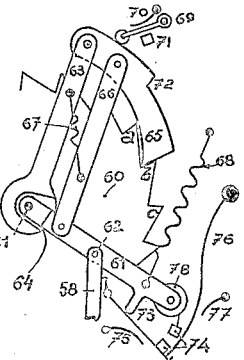
*Fig.2d*  *Fig.2e*
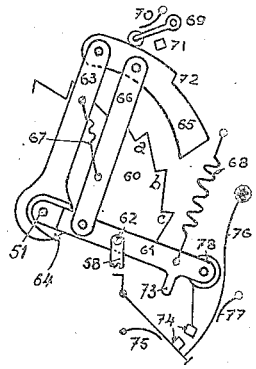 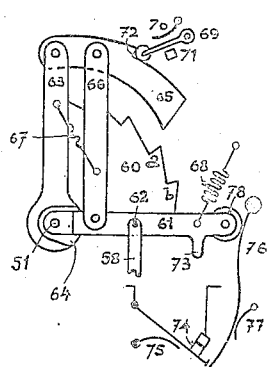
*Fig.3a*  *Fig.3b*
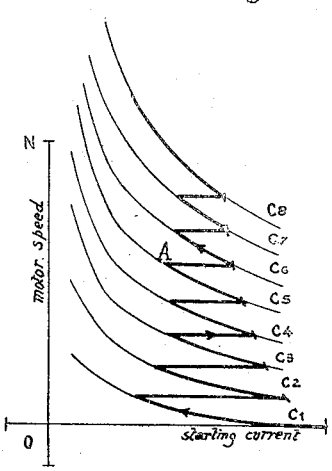 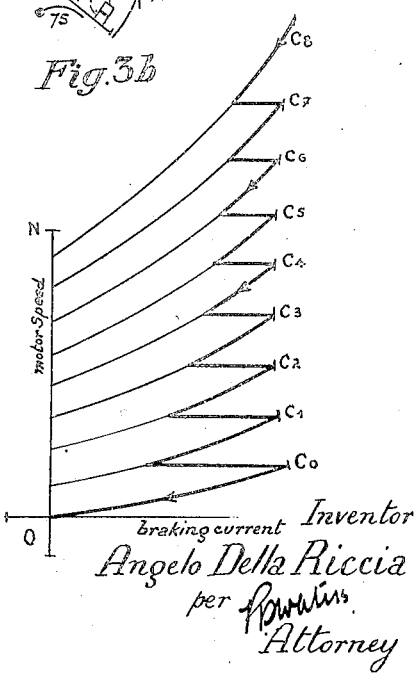
Inventor
Angelo Della Riccia
per
Attorney Sept. 12, 1933.  A. D. RICCIA  1,926,668
SYSTEM FOR AUTOMATICALLY CONTROLLING THE SPEED OF ELECTRIC MOTORS
Filed May 21, 1928   3 Sheets-Sheet 3

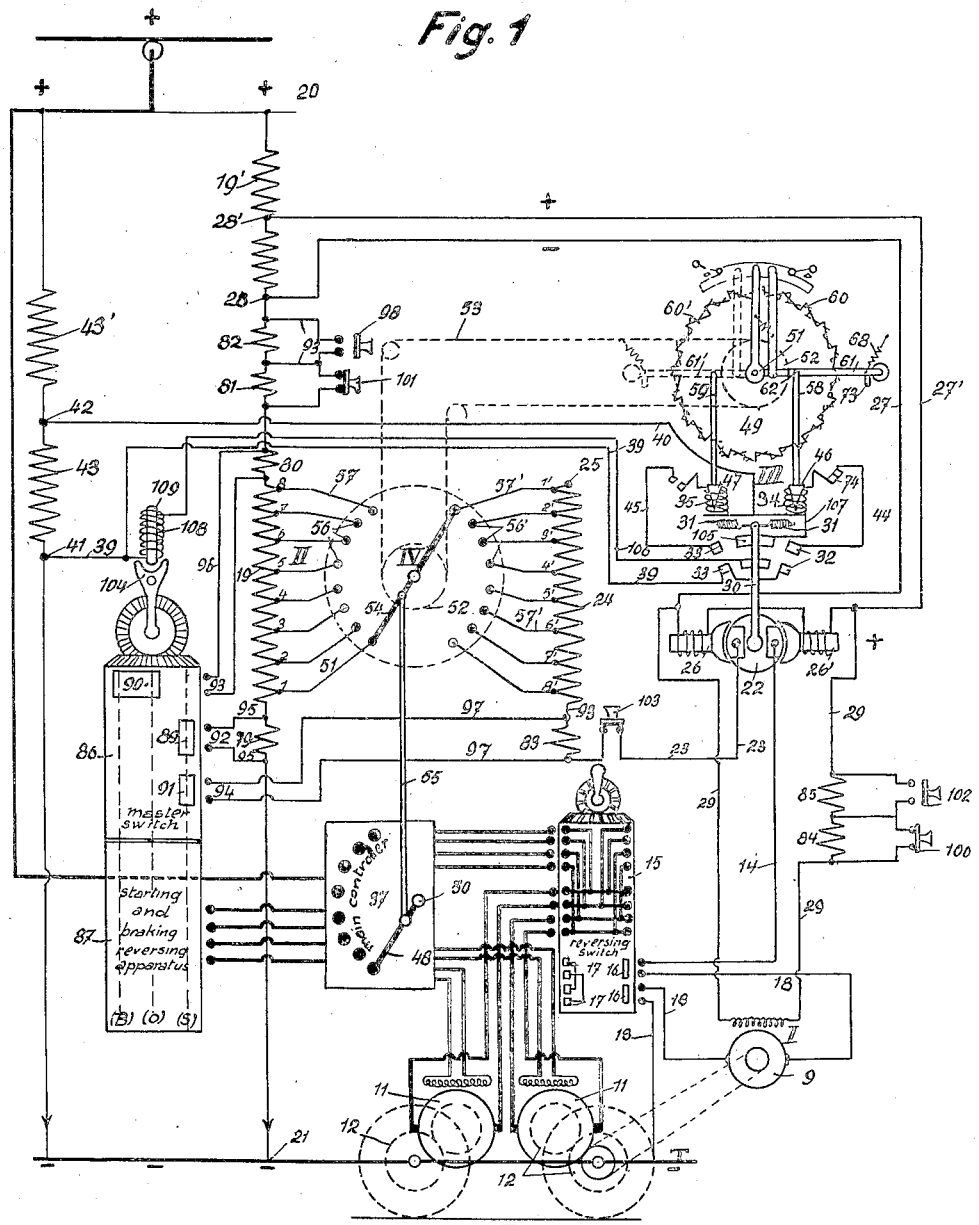

Inventor
Angelo Della Riccia
per
Attorney

Patented Sept. 12, 1933

1,926,668

UNITED STATES PATENT OFFICE 1,926,668

SYSTEM FOR AUTOMATICALLY CONTROLLING THE SPEED OF ELECTRIC MOTORS

Angelo Della Riccia, Brussels, Belgium

Application May 21, 1928, Serial No. 279,593, and in France March 7, 1928

12 Claims. (Cl. 172—288)

The present invention relates to an automatic controlling system of the speed controller of an electric traction equipment of any class operating upon direct or alternating current (single-phase or polyphase), in which the speed of the motors is regulated for the starting alone, or for both the starting and the electric braking, either with or without regeneration, this regulation being effected according to any method and by means of a controlling device of any desired type; the term "traction equipment" shall be understood in its widest meaning, that is, as including the hoisting, hauling, rolling equipment and the like and generally referring to variable speed electric motors equipment, and the term "controller" is herein applied to the device making the necessary combinations between the different essential parts of the equipment, such as the motors, resistances, regulating group, exciter, etc.

The arrangement according to the invention differs in general from all known arrangements for the automatic control of traction motors, the difference being due to the fact that it employs a single relay to move the controlling device or controller forward or backward, said relay being subjected (independently of the load on the motors and of any other factor prevailing in the circuits of the motors and their regulating devices) exclusively to the combined action of two artificial E. M. F.'s U and U' produced specially outside of the devices to be controlled, U being an E. M. F. continually increasing or decreasing with the actual speed of the mover or moving body, for instance the E. M. F. generated by a small auxiliary dynamo which is driven by an axle of the mover train for instance, and U' being an E. M. F. chosen among a series of E. M. F.'s corresponding to the regulating steps or operating position of the controller, each E. M. F. U' being equal to the value of U when the speed of the mover passes through a special predetermined value in relation to the corresponding regulating step. These two artificial E. M. F.'s U and U', which are outside of all electric factors taking place in the circuits of the motors and of their regulating apparatus, act together upon the single relay which will move the main controller forward from its actual position, to the following position or step, when the E. M. F. U sufficiently exceeds the considered E. M. F. U', or it will move back the controller from said position to the preceding one the E. M. F. U is sufficiently below said E. M. F. U'.

On account of this arrangement, the driver need only move forward or backward the handle of a single switch according as he desires to send current into the motors in order to increase the speed of the mover, or to withdraw current from the motors in order to slow down the mover. This single operation of the controller handle brings into use one or the other of two series of connections whereof one serves for starting or accelerating and the other serves for braking or slowing down; but after this time, the succession of the several combinations of either series of connections will take place automatically, according to the speed of the mover, by the sole action of the relay which acts according to this speed. This switch is advantageously connected with the usual starting and braking reversing apparatus which acts in suitable manner to change the connections between the other parts of the electric equipment when proceeding from one operation to the other; said switch will be indicated as "master switch" in the following specification.

Hence the arrangement in conformity to the invention is quite automatic and operates continuously from the first to the last position of the main controller and in both directions. It is based directly and exclusively upon the actual speed of the mover, and as it is entirely independent of all conditions prevailing in the motors and in their regulating devices it follows that it operates under the action of the speed of the train, even when the motors rotate without absorbing or producing current.

The accompanying drawings show by way of example various embodiments of the invention which is herein applied to an equipment adapted to regulate the motors both for the starting and for the electric braking.

Fig. 1 is a general view of the system in the case of a direct current traction equipment.

Figs. 2a to 2e are detail views showing on a larger scale different operating positions of one of the devices of the system.

Figs. 3a and 3b are diagrams representing the relative disposition of the curves corresponding to the regulating steps for the starting and the braking, respectively.

Figure 4:
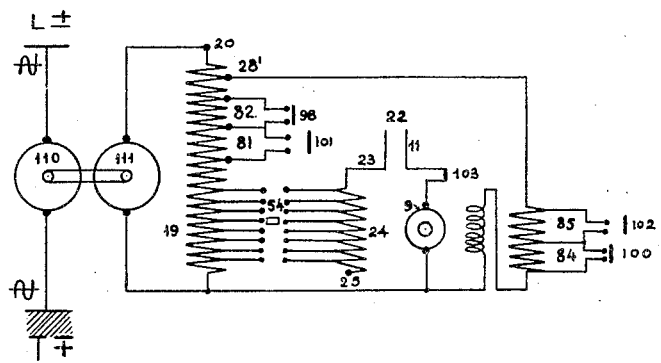
Figs. 4 and 5 show two embodiments in the case of alternating current.

The system according to the invention essentially comprises four devices in combination with a mover, a plurality of motors and a servo-motor operated controller for controlling the speed of said motors:

1. A device I adapted to generate automatically a variable E. M. F. U, which continually increases or decreases with the actual speed of the mover train (for instance).

2. A device II adapted to furnish a series of E. M. F.'s U' in steps progressively corresponding to the operating positions of said controller, i. e. E. M. F.'s which are respectively equal to the different value assumed by the E. M. F. U when the speed of the motors passes successively through the different mean values corresponding to the different operating positions or regulating steps of the main controller.

3. A device III responsive to a combined E. M. F. aU—bU' of one polarity and of a determined value for advancing the main controller in one direction and responsive to a combined E. M. F. of opposite polarity and of a determined value for returning said controller in the opposite direction. The coefficients a and b depend on the manner in which the E. M. F.'s U and U' act upon said device III, for example upon the number of turns of the windings to which said E. M. F.'s are applied.

4. A device IV operatively connected to the main controller for automatically impressing the E. M. F. U and one of the E. M. F.'s U' upon said device III to render the same responsive to a differential combination of said two E. M. F.'s, whereby the controller and said device IV are automatically moved forward and backward in a corresponding step by step manner.

In the arrangement shown in Figure 1, these four combined devices are represented as follows:

1. The device I furnishing the E. M. F. U consists of a small dynamo 9, of the direct current type, which is suitably excited and is driven by means of a suitable coupling, such as a belt 10, at a speed varying with the speed of the mover (for example a train) actuated by motors 11 through suitable gears (not shown) in such a manner that to a given value of the speed of the mover corresponds always a single value of the E. M. F. U. and inversely.

In the practice the speed of said dynamo 9 is proportional to that of the mover and the maximum E. M. F. of said dynamo should be much lower than the line E. M. F. V.

The negative pole of the dynamo 9 is grounded at T by a conductor 13 and its positive pole is connected by a conductor 14 to the device III, which is responsive to the combined E. M. F. aU—bU' as will be further explained: The polarity of the dynamo 9, driven by an axle of the train, changes with the direction of running of said train, and it is consequently necessary to provide a reversing switch 15, which reverses the connections between the armatures and the fields of the traction motors 11 when the direction of running changes from forward to backward. The contact pieces of said switch respectively 16 for the forward motion and 17 for the back motion, cooperate with terminals provided at the ends of the conductors 13 and 14 and of two conductors 18, directly connected with the dynamo 9. When proceeding from the forward running position to the rear running position, the connections will be reversed between the conductors 18 on the one hand, and the conductors 13 and 14 on the other hand, the conductor 13 remaining in all cases connected with the negative pole, and the conductor 14 with the positive pole of the dynamo 9.

2. The device II adapted to furnish the series of E. M. F.'s U' consists of a potentiometric resistance 19, which is connected at one end to the main line at 20 (by a resistance 19' in order that the sum of said E. M. F.'s will be less than the pressure of the line and by a set of elementary resistances whose object will be further explained), and at the other end to earth at 21, and it comprises various terminals 1 to 8 by which the said resistance 19 is divided into 8 different resistances 21—1, 1—2, 2—3, . . . 7—8.

This number 8 is given only as example and must be at least equal to the number of regulating steps of the operation to be controlled (starting or braking) and said 8 different resistances are calculated according to the mean normal speeds of the train in such a manner that, when the normal line E. M. F. V of the main line prevails between the trolley line (+) and the earth (—), the E. M. F. U' between the terminal 21 and the 8 different terminals 1 to 8, will have eight different values.

3. The device III for advancing and returning the main controller comprises a polarized relay 22 to whose armature the two E. M. F.'s U and U' furnished, in opposition, by the conductor 14 supplying the E. M. F. U' and a conductor 23 supplying the suitable E. M. F. U' through the medium of the device IV (further described) and an auxiliary resistance 24 insulated at 25. This armature turns in a field in two symmetrical parts 26, 26', which is supplied by a constant portion of the E. M. F. V of the main line by the conductors 27 and 27' connected respectively to the terminals 28, 28' of a resistance in series with the potentiometric resistance 19. It will be observed that the field of the auxiliary dynamo 9 may be supplied by the same portion of the E. M. F. V by means of conductors 29, connected to the conductors 27, 27'. The revolving armature of said relay 22 carries a contact arm 30 which is normally kept into the position shown in Figure 1 by antagonist springs 31 and is attracted to either the right or the left according as the combined E. M. F. aU—bU is positive or negative, thus closing the circuit at one or the other set of contacts 32 or 33 respectively.

As the springs 31 are adjusted once for all, it is necessary that the revolving armature of the relay 22 shall carry a current attaining at least a well determined value, in order that this moving armature will have sufficient force to close the circuit at one or the other set of contacts 32 or 33; now the current is determined for each operating position of the controller by the E. M. F. U' which is different for each mean normal speed of the train, and by the total resistance of the circuit 21, 19, device IV, 24, 23, 22, 14, 18, 13. The resistance 24 serves in fact to regulate this total resistance for each normal regulating mean speed. In all cases, the unit resistances comprised between the 8 different terminals 1' to 8' of the said resistance 24 are each to be determined by a previous calculation.

The contacts 32 and 33 are mounted respectively in two circuits supplying either one or the other of the windings 34, 35 of a servo-motor comprising a ratchet 60, 60' operating the main controller 37 of the equipment, by the intermediary of a chain 53, passing over two sprocket wheels 52. The said circuits comprise two common conductors 39 and 40 which are connected, on the one hand, to the two terminals 41, 42 of a local source of current (herein consisting of a potentiometric resistance 43 supplied by the main line through a resistance 43' analogous to the resistance 19') and, on the other hand, respectively to the lower parts of the two contacts 32 and 33 and to the two windings 34, 35, and two distinct conductors 44, 45 connecting said windings to the upper parts of the contacts 32, 33.

According to the position of the arm 30, either one or the other of the windings 34—35 will be energized; now said windings act upon movable armatures 46 and 47 adapted for the mechanical control (by a suitable intermediate device to be further described) of the main controller 37 in its two directions of rotation respectively.

The form of construction of this intermediate device will obviously depend upon the type of controller employed. In the arrangement herein considered, in which said controller 37 comprises an arm 48 pivoted at 50 and having a given position for each regulating step, this intermediate device (designated as a whole by 49 and shown in detail in Figures 2a to 2e) has to act upon the shaft 50 of said controller directly or through the medium of the device IV operatively connected to said controller. For convenience in the drawings said intermediate device 44 is supposed to be mounted on a shaft 51 driving the shaft 50 by means of the sprocket wheels 52 and the chain 53.

4. Said device IV adapted for impressing said E. M. F. U, furnished at each instant by the dynamo 9 and one of the E. M. F.'s U' furnished by the potentiometric resistance 19, upon the device III, consists of a multiple-way switch 54 whose form depends upon the type of controller used in the equipment in order that said switch and the main controller would be actuated in a corresponding step by step manner.

In the case represented of a main controller, comprising a rotating element 48, which has a certain angular position for each regulating step, the switch 54 then has the form of a rotating switch operatively connected to said element 48 by means of a coupling device diagrammatically shown as an articulated rod 55. The said switch 54, when rotating, makes contact in each of its angular operating positions between one of a circular series of 8 contacts 56, respectively connected by conductors 57 to the 8 different terminals 1 to 8 of the resistance 19 and one of an opposite circular series of contacts 56', respectively connected by conductors 57' to 8 terminals 1' to 8' which subdivide the resistance 24 insulated at 25 and connected by the conductor 23 to the device III.

The ratchet mechanism 49 has a double action of its two reversed symmetrical parts, one is actuated through the medium of a link 58 by the movable armature 46 controlling the clockwise rotation of the shaft 50, designated as the "forward motion of the controller", and the other is actuated through the medium of a link 59 by the movable armature 47 controlling the "back motion of the controller". Only the half which serves for the forward motion is shown in detail in Figures 2a to 2e.

On the shaft 51 is keyed a ratchet wheel 60 supposed to have 20 teeth, and there is also pivotally mounted a lever 61 to which the actuating link 58 is pivoted at 62. About the said shaft 51 is rotatable a second lever 63 having a recess 64 in which is engaged a boss of the lever 61; said recess and boss have an outline of such form that the lever 61 can only draw the lever 63 to the right when the angle between these two pieces reaches 102°, and that it can only draw it to the left when the angle between these two pieces reaches 90°.

65 is a pawl for moving clockwise the ratchet wheel 60 when it is actuated by the lever 63, and 66 is a traction bar connecting the said pawl to the lever 61.

The four pieces 61, 63, 65, 66 form a linked parallelogram whose angle at 51 may vary between 90° and 102°. A spring 67 tends to constantly bring this angle to its minimum value of 90°.

68 is a spring which urges the lever 61 into the initial position which is assumed in Figures 2a and 2e.

69 is a stop-piece provided with a roller, which is pressed by a spring 70 against an abutment 71.

When the winding 34 is energized, and thus the link 58 descends and causes the lever 61 to turn through an angle comprised between 0° and 12°, the roller of the stop-piece 69, which is pressed against a shoulder 72 of the pawl 65, will prevent the said parallelogram from turning, while maintaining its initial rectangular form. Hence the said parallelogram will be subject to deformation, stretching the spring 67, and the angle at 51 increases from 90° to 102°. At this point the shoulder 72 of the pawl 65 is released from the roller of the stop-piece 69, and the end of said pawl is inserted between the teeth a and b of the ratchet wheel 60 (Fig. 2b).

If the link 58 is further lowered, the inclination of the lever 61 increases from 12° to 30°, and the parallelogram, which is released from the action of the said roller of the stop-piece 69, and not subjected to any further deformation, will turn as a single piece and thus turns the wheel 60 by 18°, which amount is equal to the pitch of one tooth of said wheel, and thus the teeth a and b will be substituted in space to the teeth b and c (Fig. 2c).

If the action of the servo-motor now ceases, the spring 68 will raise the lever 61 to the top, and the spring 67 reduces the angle at 51 from 102° to 90°, and the end of the pawl 65 is thus released from the teeth of the wheel 60 (Fig. 2d).

The linked parallelogram then moves further back by the action of the spring 68, and the roller of the stop-piece 69 resumes its position against the shoulder 72 of the pawl 65 (Fig. 2e).

To stop the action of the winding 34 and to stop the descent of the lever 61 when the wheel 60 has moved forward by one tooth (or by 18°) it is simply necessary to cut off, in the position of Fig. 2c, the current which supplies this winding.

For this purpose the lever 61 is provided with a nib 73 which at the end of the stroke opens a switch 74 disposed upon the conductor 44 (Fig. 1) and normally held in the closed position by a spring 75; but to prevent the said switch from closing as soon as the lever begins to rise, the apparatus comprises a member 76 urged by a spring 77 which serves to hold the movable part of said switch 74 in spite of the action of the spring 75 (Figs. 2c and 2d).

To again establish the initial conditions (in which 74 is closed) when the lever 61 comes near its initial position, the lever 61 is provided with a roller 78 which displaces the member 76 at the proper time, thus releasing the movable part of the switch 74 (Fig. 2c).

As above stated, the mechanism for the back motion of the main controller is symmetrical with the one just described. It chiefly comprises (Fig. 1) an operating lever 61' actuated by the link 59 and a ratchet wheel 60' which is symmetrical with the wheel 60.

It is necessary in certain cases, which would be further specified, to change the values of the sequence of normal mean speeds corresponding to the different operating positions or steps of the controller 37. Each of said normal mean speeds which characterizes one given step of the controller is, as defined, equal to the actual speed of the mover when the suitable E. M. F. U' supplied by the device II is itself equal to the E. M. F. U controlled by the actual speed of the mover; the value of the sequence of normal mean speeds can be consequently changed either by varying the values of the different fixed E. M. F.'s U' furnished by the device II or by varying the value of the variable E. M. F. U furnished at all speeds by the device I.

Resistance elements 79, 80, 81, 82 are provided in series with the main resistance 19 and a resistance element 83 is provided on the conductor 23 which may be at will short-circuited or not to realize the first method. Resistance elements 84 and 85 are provided in the exciting circuit of the dynamo 9 which may be also short-circuited or not to vary the variable E. M. F. U furnished by said dynamo and consequently realizes the second method.

The cases in which the sequence of the normal mean speeds shall be changed are the following:

As shown in Figs. 3a and 3b, the eight "speed-current curves" for starting at constant E. M. F. (Fig. 3a) corresponding to the eight operating positions or steps of the controller, have a different aspect from the nine "speed-current curves" for the braking (Fig. 3b) corresponding to the same E. M. F.'s at which is added the null E. M. F. On the other hand, it is a known fact that the starting and braking are more rapid according as the mean value of the current along the parts of the curves covered at each step of the controller, is greater, that is, as use is made of parts of the curve nearer the right hand; as the starting curves go down on the right hand side, a more rapid starting will correspond to smaller mean speeds and, as the braking curves go up on the right hand side, a more rapid braking will correspond to higher normal mean speeds of the mover.

To obtain a sufficiently rapid starting and braking with a high efficiency of the motors, it is necessary to use for the starting, normal mean speeds whose differences between two successive steps are less than the difference between two successive normal mean speeds of braking. On the other hand, the normal mean speed corresponding to the first starting step is smaller in absolute value than the normal mean speed corresponding to the first braking step. Finally, the particular first normal mean speeds have a value which is not the same as the differences (preferably constant) between any two following steps.

In the example shown in Figure 1 the changing of the normal mean speeds (when changing from the braking operation to the starting operation) is realized by only varying the values of the 8 different fixed E. M. F.'s U' furnished by the resistance 19; an elementary resistance 79 is provided to change the first E. M. F. U' (between 21 and 1) and the corresponding first normal mean speed, and an elementary resistance 80 is provided to change the difference of potential between any two successive E. M. F.'s U' and consequently between any two successive normal speeds. For a proper operation of the system the relay 22, submitted to the difference U—U' shall be consequently actuated for a smaller difference between two successive E. M. F.'s U' for the starting than for the braking; the variable E. M. F. U having the same value for both operations, the whole resistance of the circuit 21, 19, 57, 54, 57', 24, 23, 22, 14, 13 will diminish in like manner; a resistance 83 inserted in said circuit shall be also short-circuited when proceeding from the starting to the braking.

It must be pointed out that theoretically an analogous change in the normal speeds of the mover should be operated when proceeding from starting or braking operation to no-load operation, but in practice the same connections may be used for no-load and braking operations.

The control of the said adjusting resistances 79, 80, 83 is centralized upon a revolving master switch 86 operatively connected with the reversing, starting and braking apparatus 87, known per se, comprising three main positions (S) for the starting, (O) for no-load operation (motors without current) and (B) for the braking acting in any suitable manner to change, by means of a set of contacts (not shown) the connections between the motors and the other parts of the electric equipment, when proceeding from one operation to the other. The master switch 86 and the apparatus 87 can be simultaneously operated by a common handle 104.

The switch 86 comprises thus three contacts 89, 90, 91 cooperating with terminals 92, 93, 94 of conductors 95, 96, 97 connected at the ends of the elementary resistances 79, 80, 83 respectively. It will be observed that, as above stated, the adjustment is the same for braking and for no-load operations and that the switch 86 itself can be provided with two positions only, but three positions are obligatory for the reversing, starting and braking device 87 with which said switch 86 is operatively connected.

As shown in Figures 3a and 3b and as above explained, the starting is more rapid when the normal mean speeds corresponding to the 8 steps of the controller are smaller and the braking is more rapid when said normal means speeds are higher.

Two elementary resistances 81 and 82 are provided in series with the resistance 19, supplying the fixed E. M. F.'s U' and two elementary resistances 84 and 85 are provided in the exciting circuit of the dynamo 9, supplying the variable E. M. F. U, in order to slow down or to accelerate the starting and the braking.

Thus it is possible to slow down the starting and to accelerate the braking either by short-circuiting, by means of a switch 98 cooperating with conductors 99, the part 82 of the potentiometric resistance 19 or by de-shunting, by means of a switch 100, the resistance 84 which is normally short-circuited and is in series in the exciting circuit of the dynamo 9.

It is also possible to accelerate the starting or to slow down the braking by operations which are the contrary of the preceding, i. e. by de-shunting, by means of a switch 101, the normally short-circuited element 81 of the resistance 19 and by short-circuiting, by means of a switch 102, the resistance 85 which is normally travelled by the current.

It is also possible to allow the driver of the train to temporarily suspend the automatic regulation of the starting or braking, and to lock the controller in a certain step, whereby the motors will operate upon a longer part of the "speed-current curve" than the only part corresponding to the starting or the braking under control, and then to resume the automatic regulation of this operation.

For this purpose it is simply necessary to open a switch 103 which is placed in the circuit supplying the relay 22.

When the driver of the train closes said switch 103 again, the automatic operation of the controller and hence the automatic regulation of the speed will resume its action with combined E. M. F.'s U—U' which are abnormal, but this has no inconvenience in practice, as the passage from one step to another takes place with a current which is below the normal.

The handle 104 of the master switch 86 and the reversing, starting and braking apparatus of the equipment may be provided with a fastening device by which the motors can be placed under load at starting, position (S), or at braking position (B), only when the regulating position of the main controller of the equipment has been positively adapted to the value of the actual speed of the train.

For this purpose, the arm 30, which is secured to the revolving armature 31 of the polarized relay and is adapted to close the circuit at 32 or 33, when the actual speed of the train approaches one of the extreme normal regulating speeds, may also serve to close a break 105, when the actual speed of the train is maintained at a point near the normal mean speed corresponding to the regulating step in consideration, this break is situated in a circuit supplied by conductors 106, 39 and 107, 40 by a suitable source of current such as a part of the potentiometric resistance 43 and which energizes a winding 108 acting on a core 109. Said core normally forms a stop which is engaged in a recess of the handle 104 when this latter is in its vertical position corresponding to the position (O); when the break 105 is closed, the core 109 is energized, and only at this time is the driver allowed to bring the handle 104 into one of the positions (S) or (B).

The operation of this embodiment, adapted for a motor vehicle, is as follows.

The arrangement is supposed to be in the inoperative position as shown in the drawings, i. e. the main controller secured to the revolving switch 54 is in its first position, the reversing, starting and braking device 86—87 has the position (O), and the reversing device 15 has for instance the position for forward running.

In order to start, the operator uses the handle 104, to bring the master switch 86 and reversing, starting and braking device 87 to the position (S), and since the break 105 is now closed and the core 109 energized, this operation can be effected. The motors of the vehicle are now started and begin to run. At the same time, due to the starting contact pieces 89 and 91 of the master switch 86 being closed, the potentiometric resistance 19 generates the series of fixed E. M. F.'s. corresponding to the starting curves of Fig. 3$a$ while the dynamo 9, under the action of the belt 10, generates a progressively increasing variable E. M. F. U, which also corresponds to the starting. Since the revolving switch 54 is in its first position, the potentiometric resistance 19 will supply to the polarized relay 22 the E. M. F. U$_1'$.

When U exceeds U$_1'$ by the proper quantity, the armature 22 of the relay will turn to the right; the break at 32 is closed, and the potentiometric resistance 19 sends current into the winding 34 of the servo-motor 49. Said latter now operates as described with reference to Figs. 2$a$ to 2$e$, thus turning by one tooth and thus bringing the main controller from its first step to its second as well as the switch 54 from the first notch to the second notch and then returns to its initial position. The potentiometric resistance 19 now supplies the E. M. F. U$_2'$, U$_1'$ so that the arm 30 will return to the left under the action of the spring 31, thus opening the break 32. As the speed of the vehicle increases, according to the curve C$_2$ of Fig. 3$a$, the E. M. F. U continues to increase, and when it exceeds U$_2'$ by the proper quantity, the servo-motor 49 acts again, as before, in order to advance the main controller and the switch 54 by one step.

Without any interference of the driver, the starting may thus be effected progressively until the last notch; but if upon reaching notch (5) for instance, the driver desires to interrupt the starting, he needs simply to open the switch 103 in order that the controller may remain at the step (5) corresponding to the curve C$_5$ of Fig. 3$a$, and the speed of the motors increases along this curve somewhat beyond the point A of the normal passage to the next notch. To resume the starting, i. e. the normal passage to the following notch of the main controller, the driver simply closes the switch 103. If he desires to accelerate the starting, that is utilize a portion of the "speed-current curves" situated more to the right, he will simply close the switch 98 or open the switch 100; if he desires to slow down this starting, he opens the switch 101 or closes the switch 102.

The train being thus in motion, if it be supposed that the track now has a slight slope, the driver may allow the motors to run without load, and hence he will move handle 104 from position (S) to position (O); the contact pieces 89 and 91 of the device 86 now cease their action, whilst on the contrary the contact piece 90 becomes operative, thus causing the resistance 19 to supply a series of E. M. F.'s, corresponding to given points of the curves of Fig. 3$b$, and the relay 22 now operates under a new difference U—U' of suitable value.

Although the motors of the train use no current, the system operates exactly as before under the action of the artificial variable E. M. F. U, which the dynamo 9 driven by an axle of the train, continues to furnish, and of the E. M. F.'s U' continually present at the terminals 1 to 8 of the resistance 19. The main controller is thus automatically displaced, and it proceeds from one notch to another, either rising or descending under the action of the servo-motor 49 according as the train is accelerated or slowed down, i. e. according as the variable E. M. F. U increases or diminishes. Hence this controller is always on the notch it would occupy if the motors were under pressure in the braking position.

It will be noted that in the above-mentioned case of an equipment adapted for the automatic control of the starting, the braking, and the no-load operating, it may be desired to employ for the no-load operating a scale of mean speeds, (i. e. a series of fixed E. M. F.'s U') differing from the scale used for the braking, contrary to what is the case for Fig. 1. In this case it is required to use, for the position (O) of the master switch 86, a contact piece distinct from the contact piece 90, common for the positions (B) (O) by which other resistances such as 80 (part of 19) and the circuit of the relay 22 will be adapted to this third series of speeds.

Figure 6:
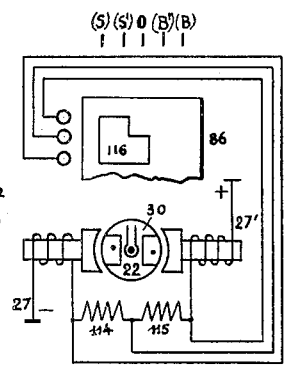
Fig. 6 is a detail view of a modification of one of the devices of the system.

In this case, the reversing, starting and braking apparatus 87 may have five operating positions instead of three (Fig. 6), of which two (S') and (B') are intermediate respectively between (S) and (O) and between (O) and (B), in which positions, since the motors operate without load as in the position (O), the resistance 19 and the circuit of the relay 22 have already been adjusted.

If the driver of the train expects that he will soon be obliged to increase (or diminish) the speed, he then places the reversing apparatus in the position (S') (or B') before the motors are placed under load, which can only occur by subsequently placing the reversing apparatus in the position (S) (or B).

As concerns the modifications resulting from the use of the described arrangement with various types of equipments, the principal modifications may be given as follows.

1. The potentiometric resistance 19 adapted to furnish the fixed E. M. F.'s U', instead of being supplied directly by the main line, may be supplied (and chiefly if the main line is an alternating current line) by a small transformer group comprising an alternator 110 branched upon this line (Fig. 4), and a direct current generator 111 supplying the potentiometric resistance 19 furnishing the E. M. F.'s U'. (In said Fig. 4, the switch 22 is only indicated by its reference number as it is the same as in Fig. 1).

Figure 5:
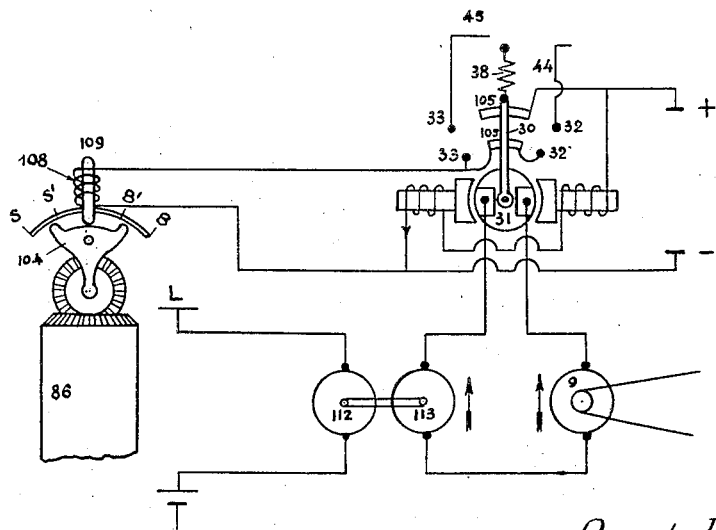

2. Fig. 5 shows a modification of the device which furnishes the fixed E. M. F.'s U' according to which a motor 112 supplied with current by the main line drives a generator 113 of the direct current type as in the case of the small dynamo 9 of the device (I). The different fixed E. M. F.'s U' can then be obtained by varying, at each regulating position of the main controller, either the speed of the motor 112, or the excitation of the generator 113, or both at the same time. These E. M. F.'s U' are thus furnished in succession.

The device IV which serves to place in opposition the pressures U and U' consists in this case of a switch serving the purpose of the switch 54 (Fig. 1) and its object is to regulate, by means of suitable resistances, either the speed of the motor 112, or the excitation of the generator 113, or both at the same time, according to the regulating step attained by the main controller of the equipment; as the generator 113 is connected in opposition to the dynamo 9, the relay 31 is subjected to a combined E. M. F. U—U' or to the two E. M. F.'s U and U' acting in antagonism or opposition.

It will be easily understood that if the device (II) consists of a motor-generator, in which a variation is made in the speed of the motor 112, or in the excitation of the generator 113, or in both at the same time, as in the case of Fig. 1, it is also required to use two regulating series for the said speed or the said excitation, or for both at the same time, according as the starting or the braking takes place. Thus it is required to employ, in addition to the master switch operatively connected with the main controller, a switch operatively connected with the reversing, starting and braking apparatus. This latter switch is shown in Fig. 5 solely by its operating handle 104, and it is supposed to have two temporary intermediate positions (B') and (S') as above stated.

In the case in which the device II consists of a motor-generator 112—113, the device used for slowing the starting and for accelerating the braking may also consist (instead of the unit resistances 81 and 82 of the resistance 19 or of resistances 84, 85 and 83 in series with the dynamo 9, Fig. 1) of a device for increasing the speed of the motor 112 or the excitation of the generator 113, or both at the same time.

3. It is evident that all of these operations can be effected without change in an equipment for alternating current (single-phase or polyphase) as shown in Fig. 4.

4. A modification shown in Fig. 6 consists of another device for adapting the relay 22 to the operation under consideration, i. e. starting, no-load running and braking. Instead of the resistances 83, 84, 85, 30 in series with the dynamo 9, it is possible to modify the sensitiveness of the said relay 22, i. e. the value of the differential combination of E. M. F.'s $aU—bU'$ at which it operates, by de-shunting successively two resistances 114 and 115 disposed in the exciting circuit 27—27' of this relay, this operation being effected by the switch 85 by means of a contact piece 116 analogous to the contact piece 91 of Fig. 1.

I claim:

1. A system for automatically controlling the acceleration and retardation of a main electric motor by means of a servo-motor operated speed controlling device, in which the servo-motor is controlled by a relay responsive to a differential combination of a variable E. M. F. constantly varying with the actual speed of said main motor and a fixed E. M. F. dependent upon the operating position of said controlling device.

2. A system for automatically controlling the speed of a moving body driven by one or several electric motors, comprising in combination with said motor or motors a servo-motor operated speed controlling device having a plurality of operating positions, means controlled by the actual speed of said moving body and distinct from said controlling device for automatically generating a variable E. M. F. constantly varying with said actual speed, means for supplying a series of fixed E. M. F.'s in steps progressively corresponding to said controlling device operating positions, means responsive to a given E. M. F. of one polarity resulting from the combination of said variable E. M. F. with one fixed E. M. F. from said series for advancing said controlling device in one direction and responsive to a determined E. M. F. combined as above of opposite polarity for returning said controlling device in the opposite direction, and means operatively connected with said controlling device for automatically impressing said first mentioned variable E. M. F. and one fixed E. M. F. from said series upon said third means to render the same responsive to a differential combination of said two E. M. F.'s, whereby the controlling device and said means operatively connected with it are automatically moved forwards and backwards in a corresponding step by step manner.

3. A system for automatically controlling the speed of a moving body or mover driven by one or several electric motors as defined in claim 2, which comprises, as means distinct from the controlling device for automatically generating the variable E. M. F. constantly varying with the actual speed of the mover, a direct current dynamo provided with means for rotating it at a speed which is substantially proportional to said actual speed of the mover.

4. A system for automatically controlling the speed of a moving body or mover driven by one or several electric motors as defined in claim 2, which comprises as means for supplying a series of fixed E. M. F.'s in steps progressively corresponding to the different operating positions of the controlling device, a potentiometric direct current resistance comprising a plurality of elementary resistances with terminals which individually correspond to a given operating position of the controlling device and determines one fixed E. M. F. of said series.

5. A system for automatically controlling the speed of a train driven by several electric motors supplied by a direct current main line, as defined in claim 2, which comprises, as means for supplying a series of fixed E. M. F.'s, in steps progressively corresponding to the different operating positions of the controlling device, a potentiometric direct current resistance supplied by the main line and comprising a plurality of elementary resistances with terminals which individually correspond to a given operating position of the controlling device and determines one fixed E. M. F. of said series.

6. A system for automatically controlling the speed of a moving body or mover driven by one or several electric motors as defined in claim 2 which comprises as means for controlling the servo-motor which advances and returns the controlling device, a relay in which the E. M. F. constantly varying with the actual speed of the mover and one fixed E. M. F. of the series act in opposition, this relay entering into action only when the differential combination of these two E. M. F.'s attains a certain limit in absolute value, a switch actuated by said relay to close, according to the polarity of said differential combination either one of two special circuits and servo-motor controlled by said two circuits and adapted to move the controlling device step by step forwards or backwards according to the circuit closed by said switch.

7. A system for automatically controlling the speed of a moving body or mover driven by one or several electric motors as defined in claim 2, which comprises as means for automatically impressing upon a relay controlling the servo-motor of the controlling device, the properly fixed E. M. F. of the series supplied by a potentiometer, a multiple switching device operatively connected with the controlling device in such a manner that the same fixed E. M. F. of the series always corresponds to a given operating position of said speed controlling device.

8. A system for automatically controlling the speed of a moving body or mover driven by one or several electric motors as defined in claim 2, comprising as controller a revolving body turning through a certain angle when proceeding from one regulating step to another and as means for advancing and returning said controller, a relay in which the E. M. F. constantly varying with the actual speed of the mover and one fixed E. M. F. of the series acts in opposition and which enters into action only when the differential combination of the two E. M. F.'s attains a certain limit in absolute value, a switch actuated by said relay to close according to the polarity of said differential combination either one of two special circuits, and a servo-motor controlled by said two circuits and adapted to move the controller step by step forwards or backwards according to the circuit closed by said switch, this servo-motor comprising two articulated parallelograms each subjected to deformation and removal by means of the current supplied by one of said two circuits, at least a pawl actuated by the deformation and removal of one of said parallelograms, a toothed wheel actuated by said pawl and rotating forwards or backwards the revolving body of the controller, and at least an interlocking device disposed to cut out said circuits after the motion of said wheel and to close them after said parallelogram has returned to its initial position.

9. A system for automatically controlling the speed of a moving body or mover driven by one or several electric motors as defined in claim 2, comprising a controlling device having a plurality of operating positions, a servo-motor actuating said controlling device in both directions, a relay responsive to the differential combination of a variable E. M. F. constantly varying with the actual speed of said moving body and one fixed E. M. F. dependent upon the operating position of said controlling device, a reversing, starting and braking apparatus of known type, for adapting said motor or motors to starting, no load running and braking, a switching device operatively connected with said reversing starting and braking apparatus to vary, according to the position of said apparatus, the value of the two E. M. F.'s, to the differential combination of which said relay is responsive.

10. A system for automatically controlling the speed of a moving body or mover driven by one or several electric motors as defined in claim 2, comprising a controlling device having a plurality of operating positions, a servo-motor actuating said controlling device in both directions, a relay responsive to the differential combination of a variable E. M. F. constantly varying with the actual speed of said moving body and one fixed E. M. F. dependent upon the operating position of said controlling device, a reversing, starting and braking apparatus, of known type and provided with a handle for adapting said motor or motors to starting, no load running and braking, a switching device operatively connected with said reversing, starting and braking apparatus to vary, according to the position of said apparatus, the value of the two E. M. F.'s to the differential combination of which said relay is responsive, and means controlled by the multiple switch operatively connected to said controlling device for fastening the handle of the said reversing, starting and braking apparatus during the operation of the said multiple switch.

11. A system for automatically controlling the speed of electric motors as defined in claim 2, which comprises a switching device for temporarily precluding the action of the direct current dynamo and of the direct current potentiometric resistance upon the polarized relay, so as to prevent the advancing and the receding of the controlling device when it is desired to maintain this controlling device in a certain operating position.

12. A system for automatically controlling the speed of electric motors as claimed in claim 2, which comprises means to modify the value of the differential combination of the two mentioned E. M. F.'s to which the means for advancing and returning the controlling device are responsive.

ANGELO DELLA RICCIA.